United States Patent
Cox

(10) Patent No.: US 7,779,411 B2
(45) Date of Patent: Aug. 17, 2010

(54) SYSTEM, METHOD AND MEDIUM FOR PROVIDING ASYNCHRONOUS INPUT AND OUTPUT WITH LESS SYSTEM CALLS TO AND FROM AN OPERATING SYSTEM

(75) Inventor: Alan Cox, Wales (GB)

(73) Assignee: Red Hat, Inc., Raleigh, NC (US)

( * ) Notice: Subject to any disclaimer, the term of this patent is extended or adjusted under 35 U.S.C. 154(b) by 1572 days.

(21) Appl. No.: 11/059,565

(22) Filed: Feb. 17, 2005

(65) Prior Publication Data

US 2006/0184948 A1   Aug. 17, 2006

(51) Int. Cl.
*G06F 9/455* (2006.01)
*G06F 9/46* (2006.01)

(52) U.S. Cl. .............................. 718/100; 718/1; 718/106
(58) Field of Classification Search ................. 718/106, 718/100, 1, 101, 102, 103, 104, 105; 709/203, 709/238; 711/154, 203; 719/328, 228, 229; 707/201
See application file for complete search history.

(56) References Cited

U.S. PATENT DOCUMENTS

| | | | | |
|---|---|---|---|---|
| 5,418,956 | A * | 5/1995 | Willman | 711/206 |
| 5,421,014 | A * | 5/1995 | Bucher | 718/100 |
| 5,553,239 | A | 9/1996 | Heath et al. | |
| 5,745,903 | A * | 4/1998 | Huan | 707/201 |
| 5,828,876 | A | 10/1998 | Fish et al. | |
| 5,845,280 | A * | 12/1998 | Treadwell et al. | 707/8 |
| 6,047,338 | A | 4/2000 | Grolemund | 710/33 |
| 6,260,057 | B1 * | 7/2001 | Eykholt et al. | 718/102 |
| 6,298,437 | B1 * | 10/2001 | Lane | 712/225 |
| 6,529,985 | B1 * | 3/2003 | Deianov et al. | 710/260 |
| 6,711,644 | B1 * | 3/2004 | Accapadi et al. | 710/263 |
| 7,058,786 | B1 * | 6/2006 | Oliveri | 711/203 |
| 7,219,157 | B2 * | 5/2007 | Blott et al. | 709/238 |
| 7,296,274 | B2 * | 11/2007 | Cohen et al. | 719/315 |
| 7,499,966 | B2 * | 3/2009 | Elnozahy et al. | 709/203 |
| 7,539,780 | B2 * | 5/2009 | Makhervaks et al. | 709/250 |
| 2002/0138664 | A1 * | 9/2002 | Blott et al. | 709/328 |
| 2004/0054858 | A1 * | 3/2004 | Chandrasekaran et al. | 711/154 |
| 2004/0093604 | A1 * | 5/2004 | Demsey et al. | 719/310 |
| 2004/0098731 | A1 * | 5/2004 | Demsey et al. | 719/328 |
| 2005/0055399 | A1 * | 3/2005 | Savchuk | 709/203 |
| 2005/0060710 | A1 * | 3/2005 | Kush | 718/103 |

OTHER PUBLICATIONS

Drepper, Ulrich. Dec. 13, 2004. "Futexes are Tricky." http://people.redhat.com/drepper/futex.pdf.

(Continued)

*Primary Examiner*—Meng-Ai An
*Assistant Examiner*—Abdullah Al Kawsar
(74) *Attorney, Agent, or Firm*—Wilmer Cutler Pickering Hale and Dorr LLP

(57) ABSTRACT

A system, method and medium for reducing the number of system calls from an application program to an operating system kernel. In an embodiment, a method includes the steps of creating a list of requests issued by an application program, associating an indicia with the list indicating whether the list contains a request, querying the indicia to determine if the list contains a request, and adding a new application program request to the list when the indicia indicates that the list includes a request.

12 Claims, 4 Drawing Sheets

OTHER PUBLICATIONS

Adams, Steve. Oct. 1999. *Oracle8i Internal Services: for Waits, Latches, Locks, and Memory*. O'Reilly & Associates, Inc. Sebastopool, California.

Kenah, Lawrence J. et al. 1984. "VAX/VMS Lock Manager." *VAX/VMS Internals and Data Structures*. Digital Press. p. 244-263.

Shah, Jay. 1991. "VAXclusters and Other High-Availability Systems." *VAXclusters: Architecture, Programming and Management*. McGraw-Hill, Inc. p. 57-99.

Schimmel, Curt. "UNIX Systems for Modern Architectures." Addison Wesley, ISBN 020163388, 1994.

http://lse.spurceforge.net/io/aio.html, retrived Nov. 19, 2005.

http://redhat.com/whitepapers/rha/gfs/GFS_INS0032US.pdf, Jul. 23, 2004.

* cited by examiner

SYSTEM, METHOD AND MEDIUM FOR PROVIDING ASYNCHRONOUS INPUT AND OUTPUT WITH LESS SYSTEM CALLS TO AND FROM AN OPERATING SYSTEM

BACKGROUND OF THE INVENTION

1. Field of the Invention

The present invention generally relates to improving operating system efficiency and, more particularly, to systems and methods for reducing the frequency of operating system calls made from and/or to a user process.

2. Background Description

FIG. 1, generally at 100, is a conventional computer system that shows the relationship between application programs 101a-n, kernel 105, and hardware 107. Application programs 101a-n can include, for example, conventional word processing, graphic and/or web browser programs, that directly interact with an end user. Application programs 101a-n are executed in user-space 103, and can be referred to as "processes," or "tasks" when program instructions are executed by the central processing unit (CPU) (not shown).

Kernel 105 includes system call interface 109, kernel subsystems 111, and device drivers 113. Application programs 101a-n communicate with kernel 105 by making a conventional system call. System call interface 109 can receive requests from processes to access hardware 107 such as printers, monitors, storage devices and/or network devices. Kernel 105 can execute these requests via kernel subsystems 111 and device derivers 113 in a conventional manner. Kernel subsystems 111 can include interrupt handlers to service interrupt requests, a memory management system to manage address spaces, and system services such as networking and interprocess communication (IPC).

As noted above, when performing conventional asynchronous input-output (AIO) between application programs 101a-n and kernel 105, application programs 101a-n invoke a system call to kernel 105 to initiate each input-output (I/O). For example, an application program 101a-n typically calls a function in a library, such as a C library, that in turn relies on system call interface 109 to instruct kernel 105 to conduct one or more tasks on its behalf. When a system call takes place, an application program 101a-n that makes the call is suspended, and the kernel 105 takes over. The context switch from the application program 101a-n to kernel 105 is costly in terms of performance, as system calls can take, for example, 10 to 1000 times more processing time than a normal processing operation, such as a CPU adding two numbers together.

Conventional techniques attempt to reduce the number of signals by ensuring that I/O requests are as large as possible, such as by allowing submission of batches of requests at a time, and/or using larger buffers (or user cache) to capture many I/O requests in the user process space before the I/O library transfers the data out. These techniques can be effective when the needed I/O is known in advance. However, these techniques are not generally effective in a streaming request environment (such as a web server).

One or more embodiments of the present invention are directed to reducing the number of operating system calls that are made from and/or to a user process.

SUMMARY OF THE INVENTION

Embodiments of the present invention are directed to enabling less system calls to be made to an operating system when the operating system is performing asynchronous input/output with, for example, an end-user application program. It is generally desirable to minimize system calls, which can take orders of magnitude more central processing unit (CPU) time than standard CPU processing operations (e.g., adding two numbers).

In one embodiment of the present invention, a task can be added to the kernel input/output (I/O) queue while that queue of asynchronous I/O is being processed. The kernel can provide or set indicia, such as a flag, that is readable, for the example, by the application program. The flag can indicate whether or not the kernel is processing any I/O for a particular process (task). For example, while the I/O queue is being processed, the operating system kernel can receive, from an application program can, pertinent data (such as, for example, the file being written to, the data that is to be written to a file, and whether the application is to be notified upon completion of the write operation). The request is written atomically to the kernel I/O queue. When the process has a next kernel I/O request, the process examines the flag to determine if the kernel has completed I/O for the process. If the flag indicates that the I/O queue is completed for the process, the kernel receives a system call. If the flag indicates that the I/O queue is not completed, then the application program need not make a system call. When the I/O is completed, the kernel can check for race conditions. If another request is present in the I/O queue due to a race condition, the kernel can dispatch the request by using a kernel interrupt handler, rather than waiting for the application program to issue a system call to the kernel.

In other embodiments of the present invention, the kernel reduces the calls that are made to wake and notify an application program process. Each application program I/O request can contain one or more flags indicating what kind(s) of notification it requires from the kernel. The flags are read, for example, by the kernel completion handler, and can thus be dynamically modified by an application program process when a request is being added to the kernel I/O queue.

For example, if the kernel I/O queue queues a file write request, and then receives additional data to write, the kernel I/O queue may receive from the application program process a new request. Prior to or during processing of the first request, the kernel can also read the flag that has been set for the application program process, and advantageously utilize the flag to eliminate making a system call to the application program upon completion of the first request. Instead, the kernel can make a call to the application program process upon completion of processing all requests associated with a particular process within the kernel I/O queue.

There has thus been outlined, rather broadly, the features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Other features of the present invention will be evident to those of ordinary skill, particularly upon consideration of the following detailed description of the embodiments.

BRIEF DESCRIPTION OF THE DRAWINGS

The detailed description of the present application showing various distinctive features may be best understood when the detailed description is read in reference to the appended drawing in which.

DETAILED DESCRIPTION OF EMBODIMENTS

Figure 1:
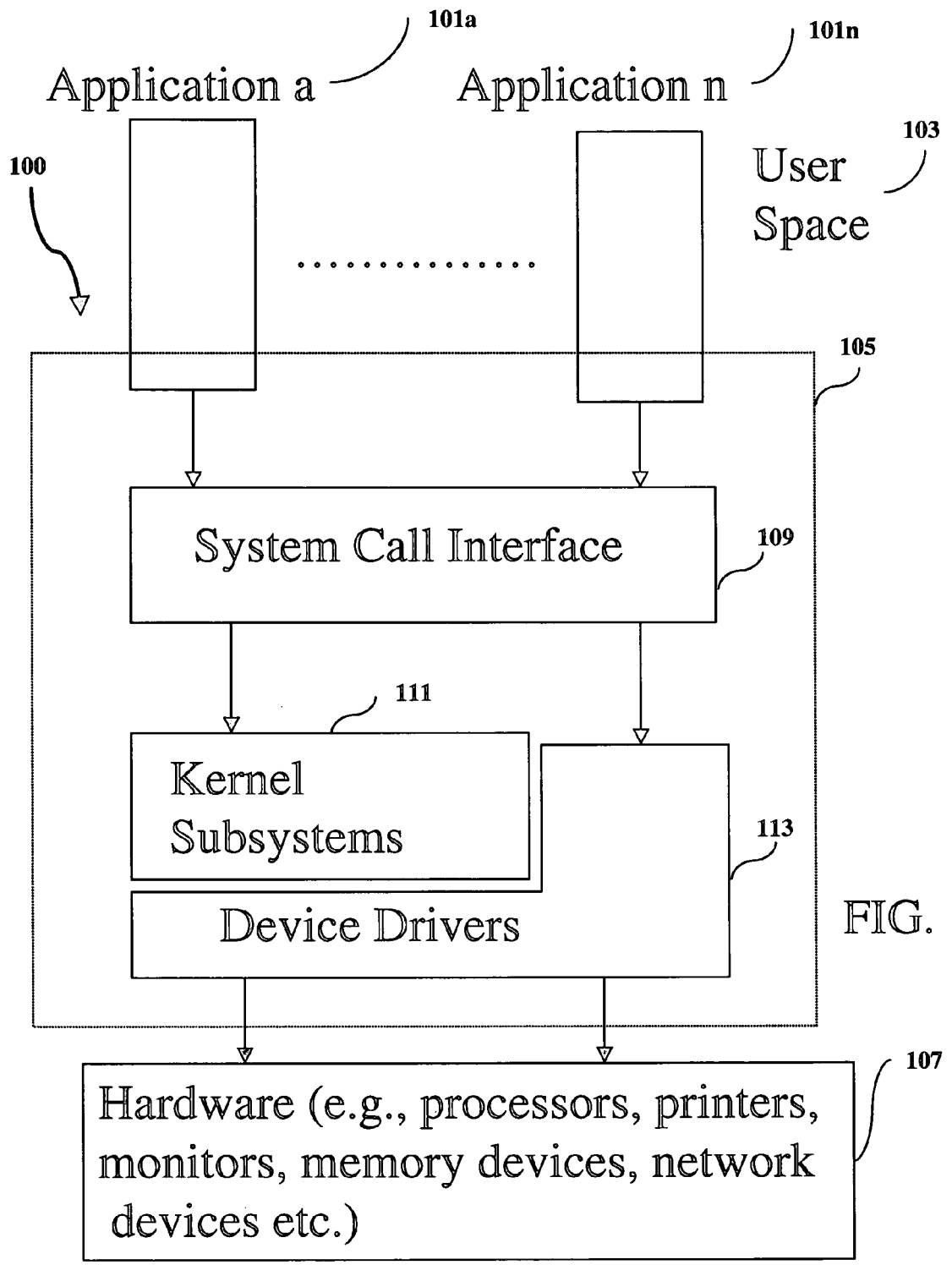
FIG. 1 is a diagram of an exemplary conventional operating system user space and kernel space.
Figure 2:
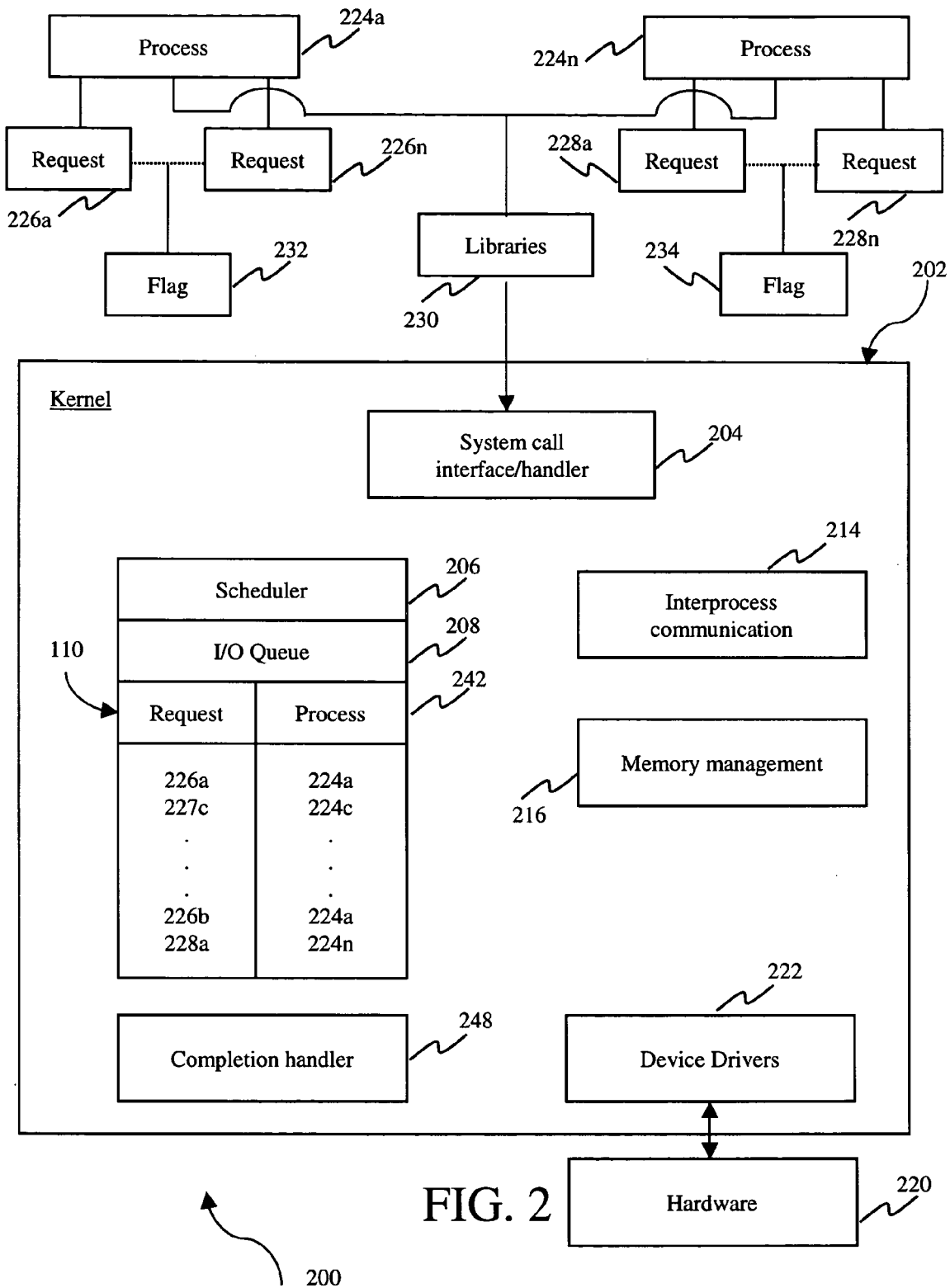
FIG. 2 is a diagram of an exemplary architecture in accordance with an embodiment of the present invention.

FIG. 2, generally at 200, is a diagram of an exemplary architecture in accordance with an embodiment of the present invention. Processes 224a-n represent various end-user application processes associated with various end-user application programs. For example, processes 224a can represent various processes of a standard word processing program such as Microsoft Word. As used herein, a process is an active program and related resources that may include open files and associated signals, an address space, and/or one or more threads of execution.

Kernel 202 is a module of the operating system that loads and remains in main memory. Kernel 202 is responsible for handling system calls, scheduling and handling completion of tasks, inter-process communication, memory management, managing input and output from hardware (such as printers, keyboards, and a mouse).

When a process 224a-n needs the service of kernel 202, the respective process(es) makes a system call to kernel 202 using system call interface/handler 204. A system call to kernel 202 switches the CPU to kernel mode, running kernel code. Kernel 202 can inspect CPU registers and/or memory to find out what service is needed.

Scheduler 206 is responsible for controlling process access to the central processing unit(s) (CPU(s) of a computer (not shown)). Scheduler 206 can enforce a policy that ensures that processes 224a-n will have access to the CPU, while ensuring that other kernel subsystems (e.g., interprocess communication 214, memory management 216, device drivers 220) are afforded adequate CPU processing time. For example, scheduler 206 may be responsible for ensuring that necessary hardware actions are performed by hardware control/device drivers 220 module in a timely manner. In connection with I/O queue 208, scheduler 206 can utilize any known scheduling technique, such as round robin scheduling, scheduling by task priority, and/or scheduling by the shortest task first.

In an embodiment, scheduler 206 provides an interface for user processes 224a-n to register for timer notification. This leads to a flow of control from the scheduler to the user processes. Finally, the scheduler communicates with the CPU (not shown) to suspend and resume processes. The CPU is responsible for interrupting the currently executing process and allowing the kernel to schedule another process.

Memory management 216 permits multiple processes 224a-n to securely share the main memory system of a computer, and supports virtual memory operations that accommodates, for example, a process (e.g., process 224a) that utilizes more memory than is available in the computer.

Interprocess communication (IPC) 214 can utilize known IPC mechanisms (e.g., pipes, sockets, and/or streams) to enable one process to communicate with another process. There are at least two reasons why processes may need to communicate. One is data transfer, where one process needs to transfer data to one or more other processes. The second reason is synchronization. For example, IPC 214 can coordinate processing of Process 224a and Process 224d, where Process 224a may require that Process 224d prepares data for it before it can continue executing. Hardware control/device drivers 222 module can communicate with the hardware 220 through standard device registers (e.g., status, control, and data device registers) to transfer data between the hardware 220 and kernel 202.

In accordance with one or more embodiments of the invention, a user process 224a-n adds one or more requests 226a-n, 228a-n to I/O queue 208 while the queue of asynchronous I/O is active for the particular process. For example, the application program associated with the process can, for example, complete fields of a new request 226a-n, 228a-n, and add the request to I/O queue 208. Thus, in FIG. 2, request/process 242 may contain, for example, request 226a associated with process 224a, request 227c associated with process 224c, request 226b associated with process 224a, etc. Each request preferably is attached atomically to I/O queue 208.

A process then tests a respective indicia, such as flag 232, 234, maintained by kernel 202, which indicates if the kernel 202 considers I/O queue 208 completed with respect to a particular process 224a-n. For example, when kernel 202 is processing request 226a associated with process 224a, flag 232 is set to indicate that processing is occurring. If, upon completion of request 226a, no other requests are in I/O queue 208 for process 224a, I/O queue 208 is considered complete with respect to process 224a, and system call interface/handler 204 can make a call to process 224a. On the other hand, if I/O queue 208 is not marked complete, then the application program associated with a process 224a does not need to make a system call using system call interface/handler 204 to add another request to I/O queue 208. Instead, process 224a, having read flag 232 to indicate that kernel 202 is processing a request (e.g., request 226a) associated with process 224a, can add another request to I/O queue 208 without making a system call using system call interface/handler 204.

Consider the following example. Process 224a submits request 226a, which is a request to print pages 1-5 of a word processing file, to I/O queue 208. At this point, flag 232 will be set to indicate that one or more requests for process 224a reside in I/O queue 208. Now suppose that the end-user of process 224a submits request 226b, which is a request to print pages 6-10, and that the request is submitted before kernel 202 completes processing of request 226a. Because flag 232 remains set to indicate that one or more requests for process 224a reside in I/O queue 208, process 224a will not have to make a call to kernel 202 using system call interface/handler 204. Instead, process 224a can submit the request to I/O queue 208 without making a system call to call interface/handler 204.

Now suppose that the end-user of process 224a submits request 226b, which is a request to print pages 6-10, after kernel 202 completes processing of request 226a. Because flag 232 will now indicate that no requests for process 224a reside in I/O queue 208, process 224a will make a call to kernel 202 using system call interface/handler 204.

When the asynchronous input/output is completed for a particular process (e.g., process 224a) in kernel 202, kernel 202 fills in the completion data for the existing I/O and checks for another entry in I/O queue 208. If there are no more entries, I/O queue 208 is marked as being completed. To avoid race conditions, I/O queue 208 can, in one or more embodiments of the present invention, be checked again (there are several standard ways to check for race conditions, this being one example). If kernel 202 finds another request for process 224a in I/O queue 208, then kernel 202 can dispatch the request by using, for example, an interrupt handler, rather than waiting for process 224a to utilize system call interface/handler 204 to request kernel 202 to process the request that has been entered into I/O queue under the race condition scenario.

In another embodiment of the invention, kernel 202 does not wake and notify processes 224a-n when a request associated with a particular process is in I/O queue 208. Each request 226, 228 contains one or more flags 232, 234 indicating what kinds of notifications that respective process 224a, 224n requires from kernel 202 upon completion of the request. The flags 232, 234 are read by the completion handler 248, and can thus be set and/or dynamically modified by processes 224a-n.

For example, suppose process 224a has an initial write-to-file request 226a, flag 232 is set, and the request is entered into I/O queue 208. Now, suppose that for process 224a, a second request 226b is generated, requesting that additional data be written to the file. Upon reading flag 232 and detecting that the write-to-file request 226a is still active, process 224a would add request 226b to I/O queue 208 without making a call to the kernel 202 using system call interface/handler 204. Because the completion flags are exposed to (readable by) processes 224a-n, kernel 202 does not need to utilize system call interface/handler 204 to make a call to process 226a after the initial write-to-file request 226a. Instead, kernel 202 can utilize system call interface/handler 204 to make a single call to process 224a at the end of the write-to-file sequence (e.g., after request 226b has been processed).

Therefore, each time a process (e.g., process 224a) adds a request to I/O queue 208, I/O queue 208 can, for example, add an entry which points to the counter of waiting I/O for the file being written to. Kernel 202 can set a flag (e.g., flag 232) associated with the process (e.g., process 224a), atomically increment a counter of I/O queue 208, and add the I/O request to I/O queue 208, thereby advantageously avoiding system calls to a process while the process has a request pending in I/O queue 208.

Figure 3:
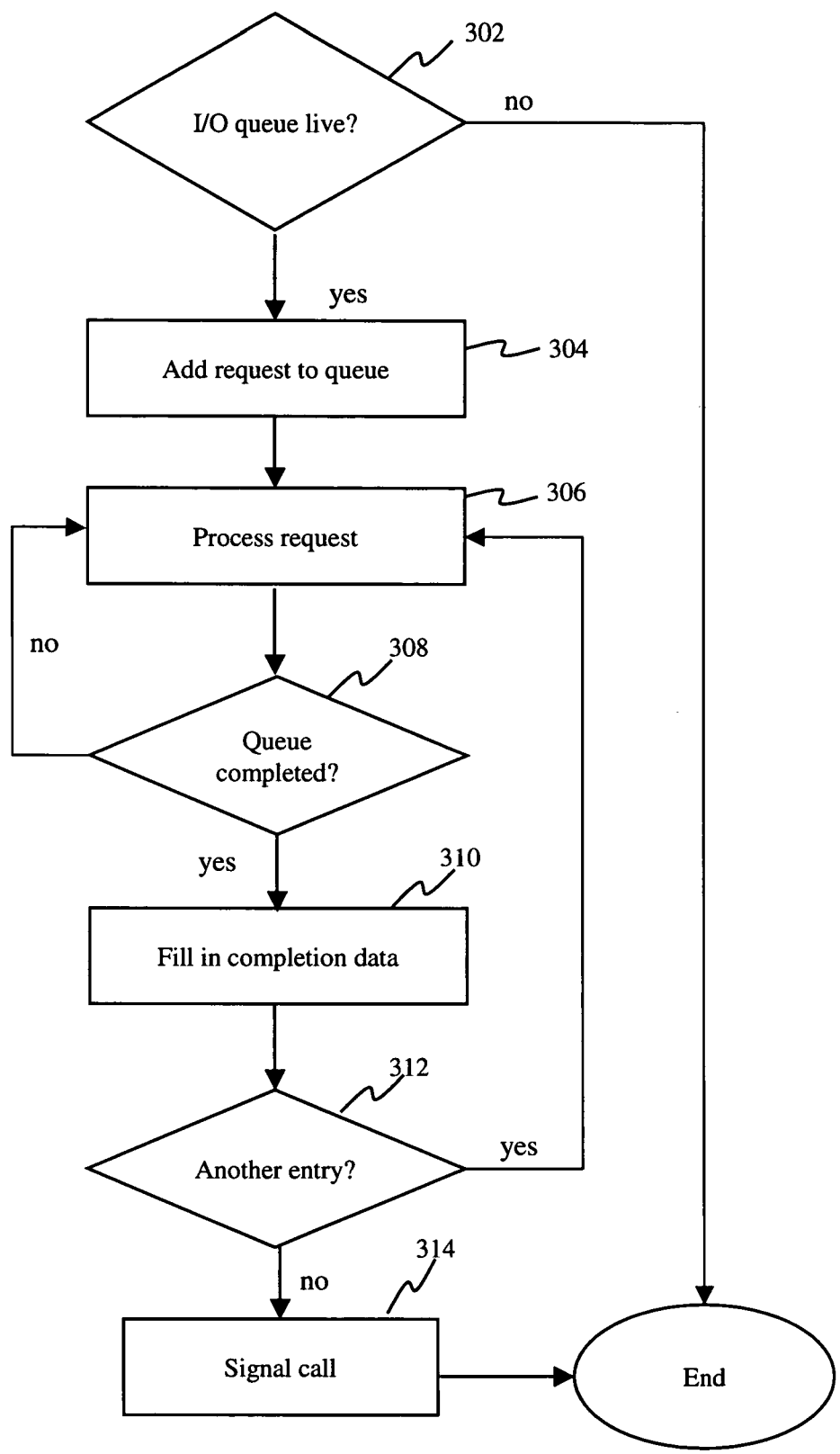
FIG. 3 is flow diagram illustrating an exemplary method of reducing system calls in accordance with an embodiment of the present invention.

FIG. 3 is flow diagram illustrating an exemplary method of reducing system calls in accordance with an embodiment of the present invention. At decision step 302, a process 224a-n can determine if the I/O queue 208 is live (with respect to the process) by examining respective flag 232, 234. If, at decision step 302, it is determined that I/O queue 208 is not live, the method ends. If, at decision step 302, it is determined that I/O queue is live, then, at step 304, a process 224a-n can add one or more requests to I/O queue 208. For example, if process 224a reads flag 232, and flag 232 indicates that I/O queue 208 is processing one or more requests 226a-n associated with process 224a, process 224a can add another request to I/O queue 208 without making a call to system call interface/handler 204. At step 306, requests are processed by the CPU.

At decision step 308, a determination is made whether I/O queue 208 is completed for a particular process. For example, if I/O queue 208 does not have any requests associated with a particular process, then I/O queue 208 is complete for that particular process. If I/O queue 208 is not complete for a particular process, the requests for a particular process continue to be processed at step 306. Again with regard to process 224a, as long as there are one or more requests 226a-n associated with process 224a in I/O queue 208, the requests will continue to be processed at step 306. When, at decision step 308, it is determined that that there are no additional requests to be processed, completion handler 248 can fill in completion data for the request(s) at step 310.

At decision step 312, a determination is made whether there is another entry in I/O queue 208. If kernel 202 determines that there is another request for a process (e.g., process 224a) in I/O queue 208, then the method returns to step 306. If it is determined that there are no more entries at decision step 312, a signal call is made at step 314, and the method ends.

Figure 4:
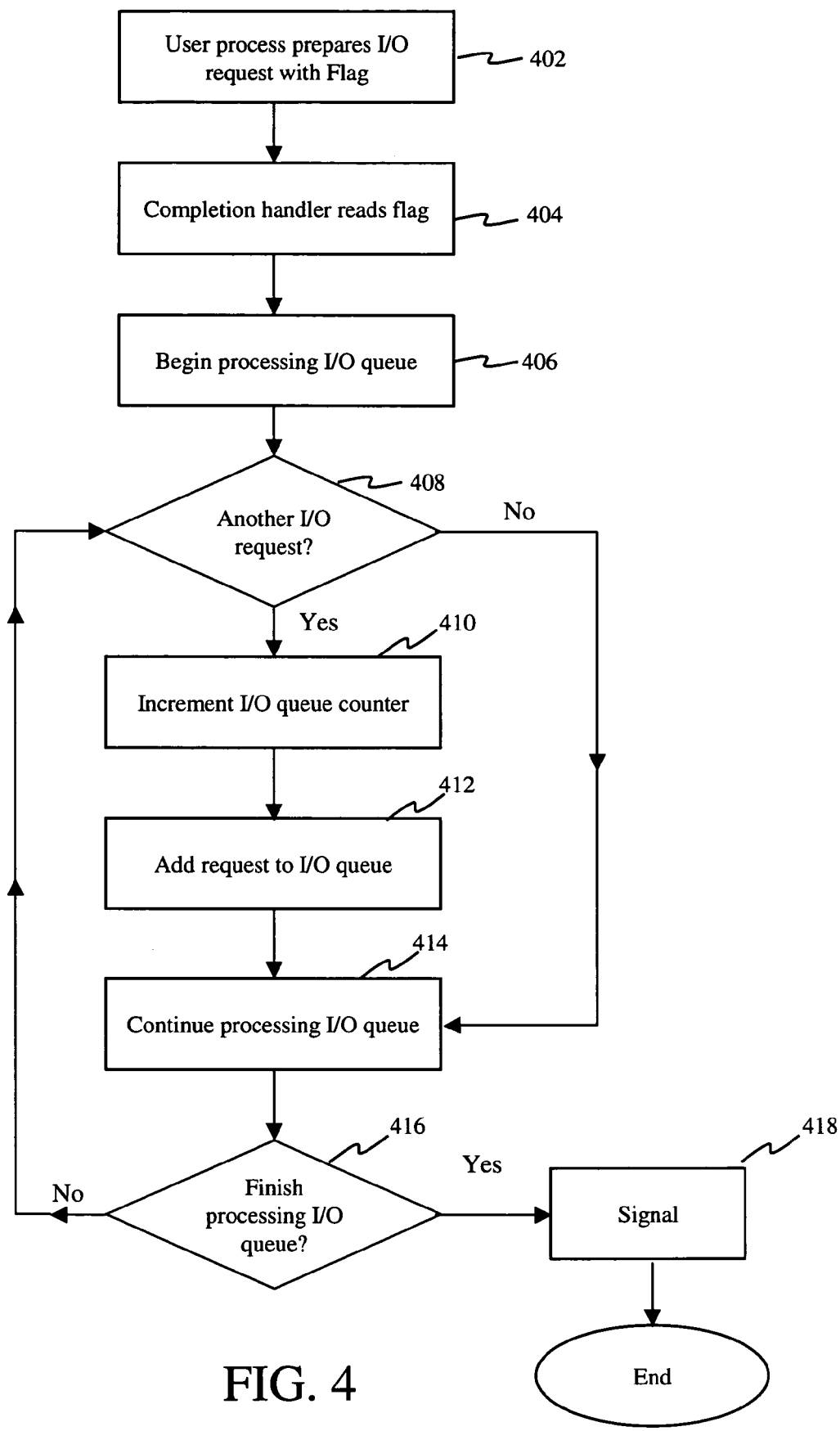
FIG. 4 is a second flow diagram illustrating an exemplary method of reducing system calls in accordance with an embodiment of the present invention.

FIG. 4 is a second flow diagram illustrating an exemplary method of reducing system calls in accordance with an embodiment of the present invention. At step 402, process 224a-n issues a respective request 226a-n, 228a-n. Requests 226a-n, 228a-n can be, for example, input-output (I/O) requests. Each request 226a-n, 228a-n will have a respective flag 232, 234 associated therewith indicating the notification(s) that respective process 224a, 224n requires from kernel 202 upon completion of request.

At step 404, completion handler 248 reads the status of the flag (e.g., 232) to determine whether a process (e.g., 224a) has one or more requests (e.g., 226a) being processed by kernel 202. At step 406, kernel 202 begins processing I/O queue 208, which contains one or more requests (e.g., 226a-d) that are associated with a particular process (e.g., 224a).

If, at decision step 408, kernel 202 determines that no new requests associated with a particular process have been added to I/O queue 208, kernel 202 continues processing the requests at step 414. If, at decision step 408, kernel 202 determines that a particular process wishes to add an I/O request to I/O queue 208 then, at step 410, kernel 202 increments a counter of I/O queue 208. At step 412, a request (e.g., 226e) is added to I/O queue 208, without making a call to the kernel 202 using system call interface/handler 204. No call is made to kernel 202 because a flag (e.g., flag 232) has been set indicating that kernel 202 is already processing one or more requests (e.g., 226a-d) associated with a process (e.g., 224a).

At step 414 kernel 202 continues to process the requests in I/O queue 208 associated with a particular process. If, at decision step 416, kernel 202 determines that there are additional requests in I/O queue 208 associated with a particular process, the method returns to decision step 408. At decision step 416, when kernel 202 determines that all requests (e.g., 226a-e) associated with a particular process (e.g., 224a) have been processed, at step 418 kernel 202 can invoke interface/handler 204 to signal process 224a after all requests associated with a particular task have been processed. The method then ends.

The many features and advantages of embodiments of the present invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for reducing the number of system calls from an application program to an operating system kernel, comprising the steps of:
   creating a list of requests to access hardware, the requests being issued by an application program;
   associating an indicia with the list indicating one or more of the requests associated with the application program are being processed, wherein the indicia comprises a flag set by the operating system kernel; and
   adding a new request from the application program to the list of requests without making a system call to the operating system kernel when the indicia indicates the one or more requests associated with the application are currently being processed.

2. The method according to claim 1, further comprising the step of the kernel receiving a system call when the indicia indicates that the list does not contain a request.

3. The method according to claim 1, further comprising the step of the kernel completing the requests issued by the application program.

4. The method according to claim 3, further comprising the steps of:
   querying the list to determine if a second new application program request exists in the list, subsequent to said completing step; and
   if a second new application program request does not exist in the list, providing an indication that the requests are completed.

5. The method according to claim 4, further comprising the step of performing said querying step a second time.

6. The method according to claim 5, further comprising the steps of:
   detecting a new application program request, subsequent to said querying step; and
   using an interrupt handler to initiate processing of the new application program request.

7. The method according to claim 1, wherein the list comprises a linked list.

8. The method according to claim 1, wherein the list comprises a table.

9. The method according to claim 1, wherein the list comprises input-output requests received from the application program.

10. A computer program product residing on a computer readable storage medium, for use in reducing the number of system calls from an application program to an operating system kernel, the computer program product comprising instructions for causing a computer to:
    create a list of requests issued by an application program;
    associate an indicia with the list indicating that one or more requests associated with the application program are being processed, wherein the indicia comprises a flag set by the operating system kernel; and
    add a new request from the application program request to the list of requests without making a system call to the operating system kernel when the indicia indicates that the one or more requests associated with the application are currently being processed.

11. The computer program product according to claim 10, wherein the requests comprise input-output (I/O) requests.

12. A computing device using at least one software module for use in reducing the number of system calls from an application program to an operating system kernel, said computing device comprising:
    at least one memory area; and
    at least one processor that uses the at least one software module to (i) create a list of requests issued by an application program; (ii) associate an indicia with the list indicating that one or more requests associated with the application program are being processed, wherein the indicia comprises a flag set by the operating system kernel; and (iii) add a new request from the application program to the list of requests without making a system call to the operating system kernel when the indicia indicates that the one or more requests associated with the application are currently being processed.

* * * * *